US008627416B2

(12) United States Patent
Keeler et al.

(10) Patent No.: US 8,627,416 B2
(45) Date of Patent: *Jan. 7, 2014

(54) DEVICE-SPECIFIC AUTHORIZATION AT DISTRIBUTED LOCATIONS

(75) Inventors: James D. Keeler, Austin, TX (US); John R. Melendez, Buda, TX (US)

(73) Assignee: Wayport, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,873

(22) Filed: Jun. 18, 2012

(65) Prior Publication Data

US 2012/0260320 A1    Oct. 11, 2012

Related U.S. Application Data

(63) Continuation of application No. 12/172,517, filed on Jul. 14, 2008.

(60) Provisional application No. 60/949,404, filed on Jul. 12, 2007.

(51) Int. Cl.
*H04L 29/06* (2006.01)
(52) U.S. Cl.
USPC ............................... 726/4; 713/168; 380/231
(58) Field of Classification Search
None
See application file for complete search history.

(56) References Cited

U.S. PATENT DOCUMENTS

| 4,026,642 | A | 5/1977 | Tanaka et al. |
| 4,233,661 | A | 11/1980 | Bolton et al. |
| 4,509,277 | A | 4/1985 | Bolton |
| 4,654,793 | A | 3/1987 | Elrod |
| 4,806,743 | A | 2/1989 | Thenery |
| 4,816,654 | A | 3/1989 | Anderl et al. |
| 4,845,504 | A | 7/1989 | Roberts et al. |
| 5,019,697 | A | 5/1991 | Postman |
| 5,030,807 | A | 7/1991 | Landt et al. |
| 5,149,945 | A | 9/1992 | Johnson et al. |
| 5,287,269 | A | 2/1994 | Dorrough et al. |
| 5,321,395 | A | 6/1994 | Van Santbrink |
| 5,351,186 | A | 9/1994 | Bullock et al. |

(Continued)

FOREIGN PATENT DOCUMENTS

| EP | 0848338 A1 | 6/1998 |
| EP | 0889418 A2 | 1/1999 |

(Continued)

OTHER PUBLICATIONS

Schneier, Bruce, One-Way Hash Functions, Applied Cryptography, 1996, pp. 429-459, Chapter 18, John Wiley & Sons.

(Continued)

*Primary Examiner* — Fikremariam A Yalew
(74) *Attorney, Agent, or Firm* — Toler Law Group, PC

(57) ABSTRACT

A method includes receiving, at a client device, an authentication seed from a first network. The method also includes receiving a shared secret. The method further includes, in response to receiving the authentication seed, determining a network address of the client device. The method further includes computing a result of a one-way hash function of a combination of the network address, the authentication seed, and the shared secret. The method further includes transmitting the network address and the result of the one-way hash function to a server that provides access control of a second network coupled to the first network. The method further includes receiving permission from the server to access the second network.

14 Claims, 9 Drawing Sheets

(56) References Cited

U.S. PATENT DOCUMENTS

| | | |
|---|---|---|
| 5,365,516 A | 11/1994 | Jandrell |
| 5,377,060 A | 12/1994 | Nigam |
| 5,487,103 A | 1/1996 | Richardson, Jr. et al. |
| 5,538,007 A | 7/1996 | Gorman |
| 5,606,616 A | 2/1997 | Sprunk et al. |
| 5,664,228 A | 9/1997 | Mital |
| 5,696,898 A | 12/1997 | Baker et al. |
| 5,727,950 A | 3/1998 | Cook et al. |
| 5,761,683 A | 6/1998 | Logan et al. |
| 5,768,384 A | 6/1998 | Berson |
| 5,781,909 A | 7/1998 | Logan et al. |
| 5,805,803 A | 9/1998 | Birrell et al. |
| 5,835,061 A | 11/1998 | Stewart |
| 5,845,070 A | 12/1998 | Ikudome |
| 5,851,149 A | 12/1998 | Xidos et al. |
| 5,889,958 A | 3/1999 | Willens |
| 5,892,829 A | 4/1999 | Aiello et al. |
| 5,936,542 A | 8/1999 | Kleinrock et al. |
| 5,968,176 A | 10/1999 | Nessett et al. |
| 5,969,678 A | 10/1999 | Stewart |
| 5,987,606 A | 11/1999 | Cirasole et al. |
| 5,991,287 A | 11/1999 | Diepstraten et al. |
| 5,991,292 A | 11/1999 | Focsaneanu et al. |
| 5,996,011 A | 11/1999 | Humes |
| 6,021,201 A | 2/2000 | Bakhle et al. |
| 6,130,892 A | 10/2000 | Short et al. |
| 6,194,992 B1 | 2/2001 | Short et al. |
| 6,219,694 B1 | 4/2001 | Lazaridis et al. |
| 6,226,277 B1 | 5/2001 | Chuah |
| 6,226,677 B1 | 5/2001 | Slemmer |
| 6,233,618 B1 | 5/2001 | Shannon |
| 6,240,533 B1 | 5/2001 | Slemmer |
| 6,253,321 B1 | 6/2001 | Nikander et al. |
| 6,259,405 B1 | 7/2001 | Stewart et al. |
| 6,285,665 B1 | 9/2001 | Chuah et al. |
| 6,317,790 B1 | 11/2001 | Bowker et al. |
| 6,317,837 B1 | 11/2001 | Kenworthy |
| 6,327,254 B1 | 12/2001 | Chuah |
| 6,363,421 B2 | 3/2002 | Barker et al. |
| 6,370,247 B1 | 4/2002 | Takaragi et al. |
| 6,377,548 B1 | 4/2002 | Chuah et al. |
| 6,377,982 B1 | 4/2002 | Rai et al. |
| 6,377,990 B1 | 4/2002 | Slemmer et al. |
| 6,393,468 B1 | 5/2002 | McGee |
| 6,393,482 B1 | 5/2002 | Rai et al. |
| 6,400,722 B1 | 6/2002 | Chuah et al. |
| 6,414,950 B1 | 7/2002 | Rai et al. |
| 6,421,714 B1 | 7/2002 | Rai et al. |
| 6,449,272 B1 | 9/2002 | Chuah et al. |
| 6,453,419 B1 | 9/2002 | Flint et al. |
| 6,460,084 B1 | 10/2002 | Van Horne et al. |
| 6,480,888 B1 | 11/2002 | Pedersen |
| 6,490,620 B1 | 12/2002 | Ditmer et al. |
| 6,496,491 B2 | 12/2002 | Chuah et al. |
| 6,512,754 B2 | 1/2003 | Feder et al. |
| 6,523,068 B1 | 2/2003 | Beser et al. |
| 6,564,327 B1 | 5/2003 | Klensin et al. |
| 6,571,221 B1 | 5/2003 | Stewart et al. |
| 6,577,643 B1 | 6/2003 | Rai et al. |
| 6,577,644 B1 | 6/2003 | Chuah et al. |
| 6,636,894 B1 | 10/2003 | Short et al. |
| 6,654,610 B1 | 11/2003 | Chen et al. |
| 6,665,718 B1 | 12/2003 | Chuah et al. |
| 6,675,208 B1 | 1/2004 | Rai et al. |
| 6,704,311 B1 | 3/2004 | Chuah et al. |
| 6,727,830 B2 | 4/2004 | Lui et al. |
| 6,732,176 B1 | 5/2004 | Stewart et al. |
| 6,790,927 B2 | 9/2004 | Inoue et al. |
| 6,801,509 B1 | 10/2004 | Chuah et al. |
| 6,829,355 B2 | 12/2004 | Lilly |
| 6,886,095 B1 | 4/2005 | Hind et al. |
| 7,009,556 B2 | 3/2006 | Stewart |
| 7,310,730 B1 | 12/2007 | Champagne et al. |
| 7,356,596 B2 | 4/2008 | Ramanujan et al. |
| 7,370,197 B2 * | 5/2008 | Huitema ............ 713/162 |
| 7,428,413 B2 | 9/2008 | Fink |
| 7,614,083 B2 | 11/2009 | Khuti et al. |
| 7,856,659 B2 | 12/2010 | Keeler et al. |
| 8,108,916 B2 | 1/2012 | Fink et al. |
| 8,261,327 B2 | 9/2012 | Keeler et al. |
| 2001/0044787 A1 | 11/2001 | Shwartz et al. |
| 2002/0022483 A1* | 2/2002 | Thompson et al. ........... 455/439 |
| 2002/0112071 A1 | 8/2002 | Kim |
| 2002/0132661 A1 | 9/2002 | Lind et al. |
| 2002/0144144 A1 | 10/2002 | Weiss et al. |
| 2003/0009382 A1 | 1/2003 | D'Arbeloff et al. |
| 2003/0117434 A1 | 6/2003 | Hugh |
| 2003/0126021 A1 | 7/2003 | Mizushima et al. |
| 2003/0185169 A1 | 10/2003 | Higgins |
| 2003/0187786 A1 | 10/2003 | Swift et al. |
| 2003/0194988 A1 | 10/2003 | Knox |
| 2003/0233580 A1 | 12/2003 | Keeler et al. |
| 2004/0128199 A1 | 7/2004 | Cusack et al. |
| 2004/0141488 A1 | 7/2004 | Kim et al. |
| 2004/0164898 A1 | 8/2004 | Stewart |
| 2004/0167929 A1 | 8/2004 | Osborne et al. |
| 2004/0170153 A1 | 9/2004 | Stewart et al. |
| 2004/0193464 A1 | 9/2004 | Szrek et al. |
| 2004/0215799 A1 | 10/2004 | Lehmann, Jr. et al. |
| 2005/0004840 A1 | 1/2005 | Wanninger |
| 2005/0021781 A1 | 1/2005 | Sunder et al. |
| 2005/0076108 A1 | 4/2005 | Li et al. |
| 2005/0094566 A1 | 5/2005 | Hares |
| 2005/0187834 A1 | 8/2005 | Painter et al. |
| 2005/0261970 A1 | 11/2005 | Vucina et al. |
| 2006/0050719 A1 | 3/2006 | Barr et al. |
| 2006/0092955 A1 | 5/2006 | Durbin et al. |
| 2006/0189298 A1 | 8/2006 | Marcelli |
| 2006/0200855 A1* | 9/2006 | Willis .............................. 726/2 |
| 2007/0063015 A1 | 3/2007 | Mebruer |
| 2008/0095180 A1 | 4/2008 | Vucina et al. |
| 2008/0097858 A1 | 4/2008 | Vucina et al. |
| 2008/0155453 A1 | 6/2008 | Othmer |
| 2009/0031404 A1 | 1/2009 | Bazzinotti et al. |
| 2009/0150977 A1 | 6/2009 | Carley |

FOREIGN PATENT DOCUMENTS

| | | |
|---|---|---|
| EP | 0909073 A2 | 4/1999 |
| EP | 0917320 A2 | 5/1999 |
| EP | 0986230 A2 | 3/2000 |
| WO | 9639668 A1 | 12/1996 |
| WO | 9812643 A1 | 3/1998 |
| WO | 9957865 A1 | 11/1999 |
| WO | 9957866 A1 | 11/1999 |
| WO | 9966400 A2 | 12/1999 |
| WO | 03073688 A1 | 9/2003 |
| WO | 2005112598 A1 | 12/2005 |
| WO | 2007060116 A2 | 5/2007 |

OTHER PUBLICATIONS

Edgett. Jeff and Albert, Roy, Generic Interface Specification, iPass, Inc., 2003, pp. 2-9.

Edgett. Jeff and Albert, Roy, iPass Generic Interface Specification, iPass, Inc., Mar. 9, 2004, pp. 2, 8-27, Version 1.3, Redwood Shores, California.

Get TEAclipper-Ready at Zero Cost, FlexiPanel Ltd, www.flexipanel.com, Nov. 17, 2001, p. 1, London UK.

HexWax Explorer, TEAclipper firmware management utility, FlexiPanel Ltd, www.flexipanel.com, Jun. 26, 2007, p. 1-3, HexWax Explorer HW050-1, London UK.

TEAclipper/PIC Firmware delivery for Microchip PIC Microcontrollers, FlexiPanel Ltd, www.flexipanel.com, Jan. 13, 2008, p. 1-8, TEAclipper/PIC DS508-6, London UK.

TEAclipper/Stamp Firmware delivery for Basic Stamps, FlexiPanel Ltd, www.flexipanel.com, Feb. 12, 2008, p. 1-3, TEAclipper/Stamp DS507-4, London UK.

TEAclipper/USB adapter for TEAclipper programming clips, FlexiPanel Ltd, www.flexipanel.com, Dec. 2007, p. 1, TEAclipper USB DS510-4, London UK.

Restriction Requirement for U.S. Appl. No. 10/851,633 mailed Sep. 25, 2007, 10 pages.

(56) References Cited

OTHER PUBLICATIONS

Non-Final Office Action for U.S. Appl. No. 10/851,633 mailed Jan. 10, 2008, 29 pages.
Final Office Action for U.S. Appl. No. 10/851,633 mailed Jul. 9, 2008, 28 pages.
Non-Final Office Action for U.S. Appl. No. 10/851,633 mailed May 11, 2009, 54 pages.
Final Office Action for U.S. Appl. No. 10/851,633 mailed Dec. 24, 2009, 49 pages.
Non-Final Office Action for U.S. Appl. No. 10/851,633 mailed Apr. 26, 2010, 31 pages.
Final Office Action for U.S. Appl. No. 10/851,633 mailed Nov. 10, 2010, 23 pages.
Restriction Requirement for U.S. Appl. No. 12/172,517 mailed Jul. 20, 2011, 6 pages.
Non-Final Office Action for U.S. Appl. No. 12/172,517 mailed Sep. 28, 2011, 27 pages.
Notice of Allowance for U.S. Appl. No. 12/172,517 mailed Mar. 9, 2012, 29 pages.
Chapman, D.B. et al., Building Internet Firewalls, Sep. 1995, O'Reily & Associates, Inc., Sebastopol, CA, pp. 131-188 and 191-207.
Hinrichs, S., Policy-Based Management: Bridging the Gap, ACSAC '99 Proceedings 15th of the Annual Computer Security Applications Conference, 1999, IEEE Computer Society, Washington, DC, pp. 209-219.
IEEE Standards for Local and Metropolitan Area Networks: Virtual Bridged Local Area Networks, IEEE, Std 802.1Q-1998, Mar. 8, 1999, IEEE, New York, NY, pp. i-xii and 1-199.
International Search Report and Written Opinion, Application No. PCT/US2005/017738, Oct. 10, 2005, 12 pages.
Single-User Network Access Security TACACS+, Cisco White Paper, XP002124521, Mar. 30, 1995, pp. 1-9.

\* cited by examiner

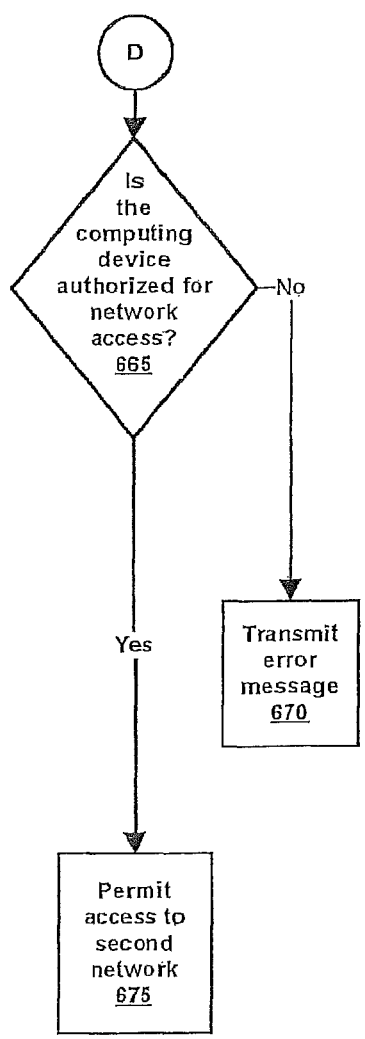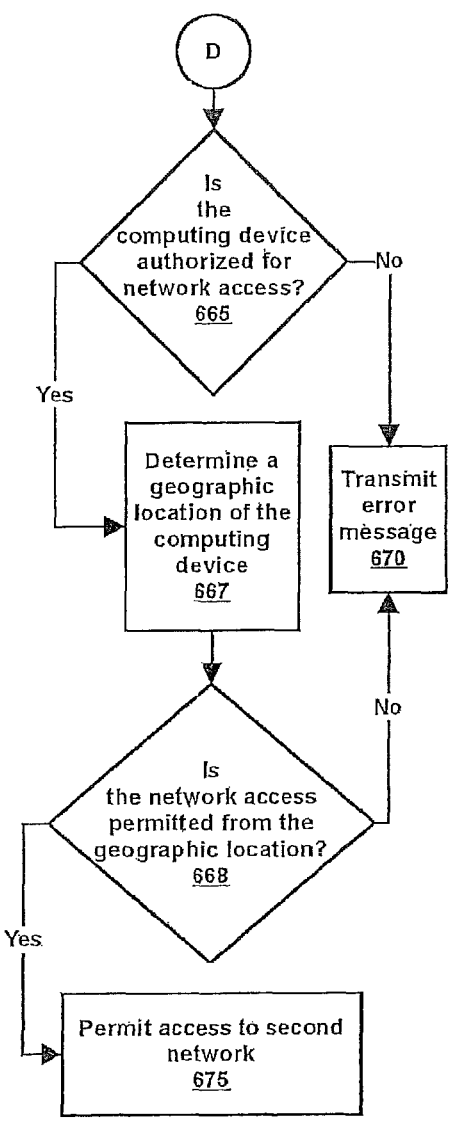

US 8,627,416 B2

DEVICE-SPECIFIC AUTHORIZATION AT DISTRIBUTED LOCATIONS

CROSS REFERENCE TO RELATED APPLICATIONS

The present application claims priority from and is a continuation application of U.S. patent application Ser. No. 12/172,517, filed Jul. 14, 2008 and titled "DEVICE-SPECIFIC AUTHORIZATION AT DISTRIBUTED LOCATIONS," which claims the benefit of and priority from U.S. Provisional Application Ser. No. 60/949,404, filed Jul. 12, 2007 and titled "SYSTEM AND METHOD FOR DEVICE-SPECIFIC AUTHORIZATION AT DISTRIBUTED LOCATIONS," both of which are expressly incorporated herein by reference in their entireties.

U.S. patent application Ser. No. 10/851,633, titled "METHOD FOR PROVIDING WIRELESS SERVICES" and filed on May 21, 2004, is hereby incorporated by reference in its entirety as though fully and completely set forth herein.

U.S. Pat. No. 5,835,061, titled "METHOD AND APPARATUS FOR GEOGRAPHIC-BASED COMMUNICATIONS SERVICE" is hereby incorporated by reference in its entirety as though fully and completely set forth herein.

FIELD OF THE DISCLOSURE

The present disclosure is in the field of Internet access and, more specifically, Internet access at distributed locations.

BACKGROUND

Several Internet service providers (ISPs) provide services at public locations such as hotels, airports, restaurants, coffee shops, etc. (so-called "hot-spots"). Many of these locations provide service for a fee. The fee may be provided via a web-browser interface using credit card, debit card, prepaid card, etc., or the user may be part of a subscriber group where access may be granted for the subscriber via submission of subscription credentials (e.g., a username and password) inputted by a user.

Whereas this authentication mechanism works well for devices that support a web browser and have a keyboard to enter username and password or credit card credentials, it is inconvenient as many of these devices are small and have limited user input capabilities. Moreover, this browser-based authentication mechanism may be somewhat difficult in systems that do not support web browsers.

Many ISPs control the access to a site via the MAC (media access control) address of the network interface card that connects to the internet. Hence, some ISPs have taken the approach of storing a database of MAC addresses of devices, then, when the device appears on the plant, the device is automatically authenticated via MAC address.

Whereas this MAC address identification may be convenient in that it may not require user input for various network access, and also in that it is device specific, unfortunately it is not secure or can be compromised. That is, the MAC address can be changed and/or "spoofed" in which the MAC address of any device can be masqueraded as one of the MAC addresses of the allowed devices.

Another method for authentication that is slightly more secure is to use a certificate-based system (e.g. using X.509 certificates). While this is more secure, the X.509 certificates can be shared. Moreover, an individual certificate would have to be created, managed and placed on each device, creating a management problem for millions of devices.

What is needed is a convenient method that is manageable and may not be easily compromised.

BRIEF DESCRIPTION OF THE DRAWINGS

The preferred embodiments will become apparent upon reading the following detailed description and upon reference to the accompanying drawings in which:

FIG. 6B is a flowchart diagram of a method, according to various embodiments;

FIG. 6C is a flowchart diagram of a method, according to various embodiments;

Figure 1:
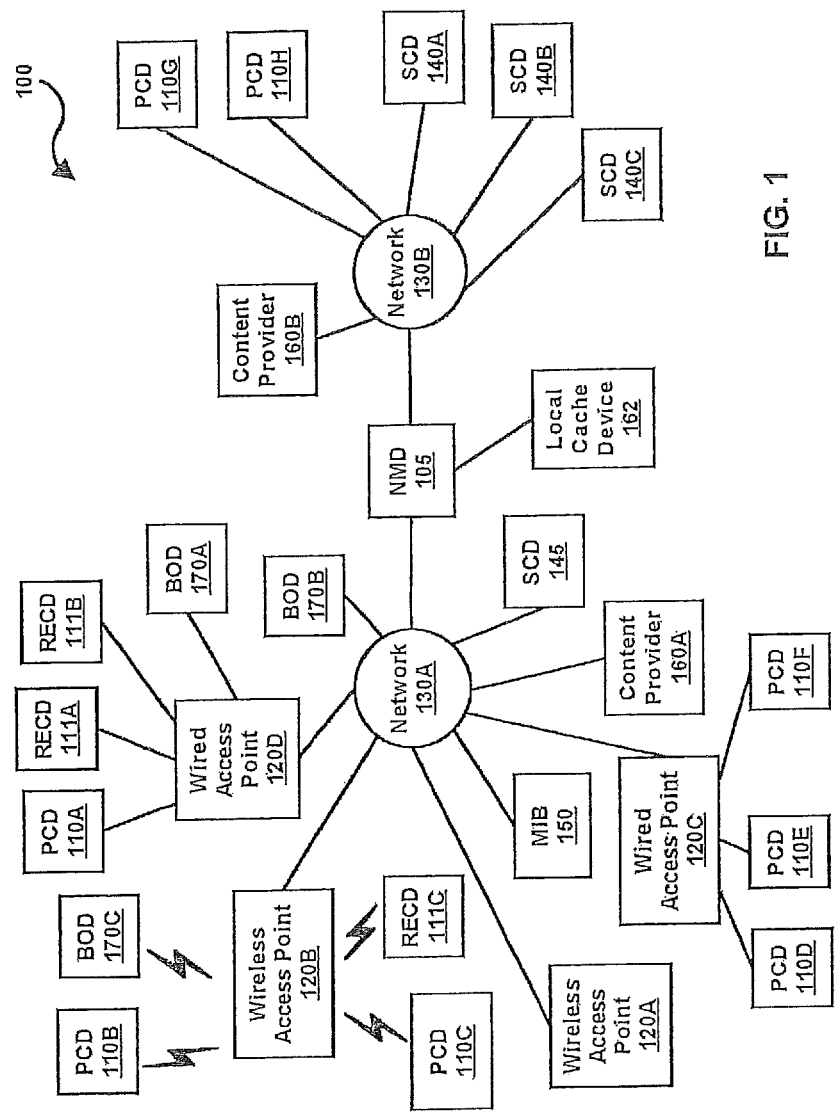
FIG. 1 is a block diagram of a network communication system, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning to FIG. 1, a network communication system (NCS) 100 is illustrated, according to various embodiments. NCS 100 may include one or more access points (APs) such as APs 120A-120D. In various embodiments, wired APs 120C-120D may each communicate with one or more computing devices in a wired fashion. For example, wired access point (AP) 120C may communicate with portable computing devices (PCDs) 110D-110F in a wired fashion, and wired AP 120D may communicate with portable computing device (PCD) 110A in a wired fashion. In some embodiments, wireless APs 120A-120B may each communicate with one or more computing devices in a wireless fashion. For example, wireless AP 120B may communicate with a PCD 110B and/or a PCD 110C, and wireless AP 120A may communicate with other computing devices. Each of wireless APs 120A-120B may include a wireless transceiver and may operate according to one or more wireless standards, such as Institute of Electrical and Electronics Engineers (IEEE) 802.16, wireless Ethernet (IEEE 802.11), Bluetooth (IEEE 802.15), General Packet Radio Service (GPRS), CDMA (code division multiple access), TDMA (time division multiple access), FDMA (frequency division multiple access), ultra wide band, digital, and/or infrared communication technologies, among others.

Each of APs 120A-120D may be coupled to a network 130A. Network 130A may be coupled to a network management device (NMD) 105. NMD 105 may be coupled to a network 130B. In various embodiments, NMD 105 may provide authentication, quality of service (QoS), communication traffic shaping, and/or access control from one or more computing devices (e.g., PCDs 110A-110F, retail entity computing devices (RECDs) 111A-111C, and back office devices (BODs) 170A-170C) coupled to network 130A through one of APs 120A-120D to network 130B. In some embodiments, NMD 105 may include an access control mechanism and/or a firewall mechanism. For example, the access control mechanism and/or the firewall mechanism may be used in conducting data communications in accordance and/or in association with providing various network access, qualities of services, and/or traffic shaping.

In various embodiments, network 130A and/or network 130B may include a wired network, a wireless network or a combination of wired and wireless networks. Network 130A and/or network 130B may include and/or be coupled to various types of communications networks, such as a public switched telephone network (PSTN), an Internet, a wide area network (WAN) (e.g., a private WAN, corporate WAN, etc.), a local area network (LAN). Thus, NMD 105 may be coupled to a PSTN, e.g., Ethernet cable and DSL; a cable (television) based network; a satellite-based system; and/or a fiber based network; among others.

In some embodiments, network 130A and/or network 130B may include one or more wireless networks, e.g., based on IEEE 802.11 and/or IEEE 802.16. For instance, one or more wired and/or wireless APs 120A-120D may be coupled to network 130A in a wireless fashion. Network 130A and/or network 130B may include one or more DSL (digital subscriber line) and/or cable (e.g., cable television) networks and/or infrastructures. For example, network 130A and/or network 130B may include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In various embodiments, network 130B may form part of the Internet, or may couple to other networks, e.g., other local or wide area networks such as the Internet.

In various embodiments, access to these networks may include one or more "services" these networks may provide. For example, these one or more services may include: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and/or video, among others. In some embodiments, these one or more service may be associated with and/or correspond to one or more protocols of one or more computer and/or software applications.

NCS 100 may include one or more content providers 160A-160B. In some embodiments, content provider 160A may be coupled to network 130A. In some embodiments, content provider 160B may be coupled to network 130B. Content provider 160A and/or content provider 160B may provide content such as audio, video, text, pictures, and/or maps among others through one or more protocols. Some or all of the information from content provider 160A and/or content provider 160B may be pre-distributed to a local cache device 162 (such as a computer system, a computer hard drive, and/or other memory media) which may facilitate faster local access to the content and/or which may minimize delays and/or costs of transmitting the content through a network, such as network 130B.

The content may be based on a retail entity and/or one or more promotions of the retail entity. For example, the content may be entertainment type content to entice customers into the retail entity locations. For example, for a fast food restaurant, such as a McDonalds, content may be provided that is geared to children, such as games based on current McDonalds promotions and/or themes, etc. In some embodiments, network access to this type of enticement content may be given freely to purchasing customers to entice them to visit the retail location. This type of network content may be provided in lieu of traditional "plastic toys" or other items routinely given out to children in these restaurants.

In some embodiments, content provider 160A and/or content provider 160B may provide content that may be used by a business itself, e.g., content to train employees of the retail entity and/or provide necessary business information. In some embodiments, NMD 105 may include content provider 160A or the content and/or functionality of content provider 160A. A portion or all of the content may be cached on the local cache device 162.

In some embodiments, one or more back office devices (BODs) 170A-170C may be coupled to network 130A. For example, one or more of a BODs 170A-170C may include a cash register, a point of sale (POS) terminal, a smart card reader, a camera, a bar code reader, a radio frequency identification (RFID) reader, a credit card reading mechanism, and/or a remote order placing device, among others. In some embodiments, the remote order placing device may allow a retail entity to remotely accept orders from customers using the remote order placing device. For example, a customer may use a "drive-thru" window and the remote order placing device at one location, and the retail entity may accept the order at another location. For instance, the retail entity may accept orders in a first city from customers using the remote order placing device in a different second city.

In various embodiments, one or more of BODs 170A-170C may be configured to contact a clearinghouse through one or more networks (e.g., one or more of networks 130A-130B) to debit one or more credit and/or debit card accounts. One or more of BODs 170A-170C may include other mechanisms to identify a customer and/or customer account information. The POS terminal may include a smart card reader. In some embodiments, a back office device (BOD) may be coupled to a network through a wired AP. For example, BOD 170A may be coupled to network 130A through wired AP 120D. In various embodiments, a BOD may be coupled to a network in a wireless fashion. For example, BOD 170C may be coupled to network 130A through wireless AP 120B.

In some embodiments, a retail entity computing device (RECD) may be coupled to network 130A. Retail entity computing devices (RECDs) 111A-111B may be coupled to network 130A in a wired fashion (e.g., through wired AP 120D) while RECD 111C may be coupled to network 130A in a wireless fashion (e.g., through wireless AP 120B). A retail entity may provide RECDs 111A-111C at various locations of the retail entity. RECDs 111A-111C may be used by customers of the retail entity to access content and/or network services offered at the various locations. In various embodiments, the retail entity may distribute access codes, and the access codes may be used to authenticate a user for service. For example, an access code may be used to authenticate a user for access to network 130B. One or more of RECDs 111A-111C may be "locked down" to prevent theft.

The retail entity may distribute access codes to access content through one or more of RECDs 111A-111C. For example, a customer of the retail entity may receive an access code and use the access code with RECD 111B to access content from one or more of content providers 160A-160B. In various examples, the content may include audio, video, maps, pictures, and/or text, among others. For instance, the content may include a movie trailer, a music video, a computer-implemented game, web pages, graphics, a digital news publication, and/or a digital magazine, among others. Some or all of the content may be cached on a local cache device 162. The content cache may be updated, replaced, or added to based on various factors including the date of the content (e.g. digital magazines and/or digital newspapers may be updated once/day or once/week), the local demographics or local area attractions, size of the data, available bandwidth for download, and/or other scheduled mechanism for updating the cached content.

In some embodiments, NCS 100 may include a server computing device (SCD) 145 coupled to network 130A. SCD 145 may store and/or provide various shared secrets to various computing devices coupled to network 130A. In various embodiments, SCD 145 may communicate with various computing devices coupled to network 130A using use one or more secure and/or encrypted methods and/or systems. For example, SCD 145 may communicate with various computing devices coupled to network 130A using transport layer security (TLS), HTTPS (secure hypertext transfer protocol), and/or a secure socket layer (SSL), among others.

In some embodiments, NCS 100 may include one or more server computing devices (SCDs) 140A-140C and/or one or more PCDs 110G-110H coupled to network 130B. In one example, SCD 140A may include various authentication and/or authorization services used in providing access from network 130A to network 130B. In a second example, one or more of SCDs 140B-140C may provide content and/or other network services described herein. For instance, SCD 140B may provide SCD 145 with one or more shared secret updates. SCD 140B and SCD 145 may communicate in a secure fashion (e.g., using TLS, HTTPS, SSL, etc.). In another example, one or more PCDs 110G-110H may exchange data associated with one or more network services described herein. In various embodiments, one or more computing devices coupled to network 130A may be permitted to access and/or communication with computing devices coupled to network 130B after being permitted to do so.

NCS 100 may include a management information base (MIB) 150. MIB 150 may be coupled to network 130A. In various embodiments, MIB 150 may be a mechanism, such as a memory, which may allow the persistent storage and management of information that may be used by network 130A to operate. In some embodiments, MIB 150 may store a data structure, such as a table comprising a list of identification information and a corresponding list of two or more possible networks and/or services. The data structure may also store access information, which may include associated methods for providing data to/from the respective two or more possible networks and/or services. The access information may include access level and/or privilege level information. The data structure may include a table of two or more tuples, with each tuple including the identification information. In various embodiments, the data structures that store this information may be included in each of the APs 120A-120D, or may be provided in various other locations.

MIB 150 may store other information, such as a directory of one or more of the elements (e.g., access points, computing devices, etc) in NCS 100, network topology information, characteristics of individual network elements, characteristics of connection links, performance and trend statistics, and/or any information that may be of interest in operating network 130A. For example, MIB 150 may store longitude, latitude, altitude and/or other geographic information that may be used to locate one or more access points and/or one or more geographic regions.

In some embodiments, NMD 105 may be a computer system operable to include one or more of MIB 150, network 130A, SCD 145, various networking equipment, and/or one or more APs 120A-120D, among others.

In various embodiments, a user operating a computing device (e.g., one of PCDs 110A-110F) may communicate with one of the APs 120A-120D to gain access to a network and its services, such as the Internet. One or more of PCDs 110B-110C may have a wireless communication device, e.g., a wireless Ethernet card, for communicating with one or more of the wireless APs 120A-120B. One or more of PCDs 110A and 110D-110F may have a wired communication device, e.g., an Ethernet card, for communicating with one or more of the wired APs 120C-120D. In various embodiments, one or more of PCDs 110A-110F may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, or other wired or wireless device. One or more of PCDs 110A-110F, RECDs 111A-111C, BODs 170A-170C, and/or content provider 160A may include various wireless or wired communication devices, such as a wireless Ethernet card, paging logic, RF (radio frequency) communication logic, a wired Ethernet card, a modem, a DSL device, an ISDN device, an ATM (asynchronous transfer mode) device, a parallel and/or serial port bus interface, and/or other type of communication device.

In some embodiments, one or more of PCDs 110A-110F, RECDs 111A-111C, BODs 170A-170C, and/or content provider 160A may include a memory medium which stores identification (ID) information and/or shared secret information. The identification information may be a System ID (an IEEE 802.11 System ID), a processor or CPU ID, a Media Access Control (MAC) ID of a wireless or wired Ethernet device (e.g., a MAC address), network identification information, and/or other type of information that identifies the computing device. The identification information may be included in a digital certificate (e.g., an X.509 certificate), which may be stored in a web browser, in a client software, and/or in a memory medium of the computing device. In various embodiments, the shared secret information may be stored in a memory medium of the computing device and may be accessible by client software of the computing device. For example, the shared secret information may include various strings of data that may be combined with other data which may be used in determining a result of a one-way hash function.

In communicating with wireless APs 120A-120B, the wireless communication may be accomplished in a number of ways. In some embodiments, one or more of PCDs 110B-110C, BOD 170C, RECD 111C, and wireless APs 120A-120B may be equipped with appropriate transmitters and receivers compatible in power and frequency range (e.g., 900 MHz, 2.4 GHz, 3.6 GHz, 5 GHz, among others) to establish a wireless communication link. Wireless communication may also be accomplished through cellular, satellite, digital, and/or infrared communication technologies, among others. To provide user identification and/or ensure security, a computing device and/or wireless AP may use any of various security systems and/or methods.

In communicating with wired APs 120C-120D, the wired connection may be accomplished through a variety of different ports, connectors, and/or transmission mediums. For example, one or more PCDs 110A and 110D-110F, RECDs 111A-111B, and BOD 170A may be coupled through an Ethernet, universal serial bus (USB), FireWire (IEEE 1394), serial, and/or parallel transmission cables, among others. One or more of PCDs 110A and 110D-110F may include various communication devices for connecting to one of the wired APs 120C-120D, such as wired Ethernet cards, modems, DSL adapters, ATM adapters, IDSN devices, or other communication devices. In one example, a hotel may have Ethernet connections in the restaurants, shops, meeting rooms, and/or guest rooms. In a second example, a fast-food restaurant and/or a coffee shop may have both wireless and wired connections for mobile users. A user may connect to a wired AP 120C through the use of a laptop computer (e.g., one of PCDs 110D-110F), an Ethernet network card, and a network cable. This connection may have the same impact as a connection made to a wireless AP 120B. In other words, a user using a wired portable computing device may be able to use various network infrastructures in the same manner as a user using a wireless portable computing device.

In some embodiments, access codes to content may be provided to customers with a purchase of goods and/or services. For example, a customer may receive an access code to download a computer-implemented game. The computer-implemented game may be downloaded to one or more of PCDs 110A-110F, for instance. The access code to download a computer-implemented game may be distributed instead of a toy or trinket that may have accompanied a purchase of a meal. The computer-implemented game may include one or more digital rights management schemes. For instance, a digital rights management scheme may provide protection against further distribution of the computer-implemented game, e.g., not allowing distribution of the computer-implemented game to another computing device after it is downloaded. A digital rights management scheme may allow the computer-implemented game to only be played at a location of the retail entity.

In various embodiments, NCS 100 may be geographic-based. In other words, the NCS 100 may provide information and/or services to a computing device (e.g., one of PCDs 110A-110F, RECDs 111A-111C, RECDs 111A-111C, and BODs 170A-170C) based at least partly on the geographic location of the computing device, e.g., as indicated by one or more of APs 120A-120D and/or as indicated by geographic information (e.g., GPS information, fast-food restaurant and/or coffee shop location, room identification, room number, room name, and/or room area, among others) provided from the computing device. In some embodiments, one or more of APs 120A-120D may be arranged at known geographic locations and may provide geographic location information regarding the geographic location of the user and/or the computing device. In some embodiments, a computing device (e.g., one of PCDs 110A-110F, RECDs 111A-111C, and BODs 170A-170C) may provide geographic location information of the computing device through an access point (e.g., one of APs 120A-120D) to network 130A. For example, the computing device may include GPS (Global Positioning System) equipment enabling the computing device to provide its geographic location through the access point to network 130A.

Figure 2:
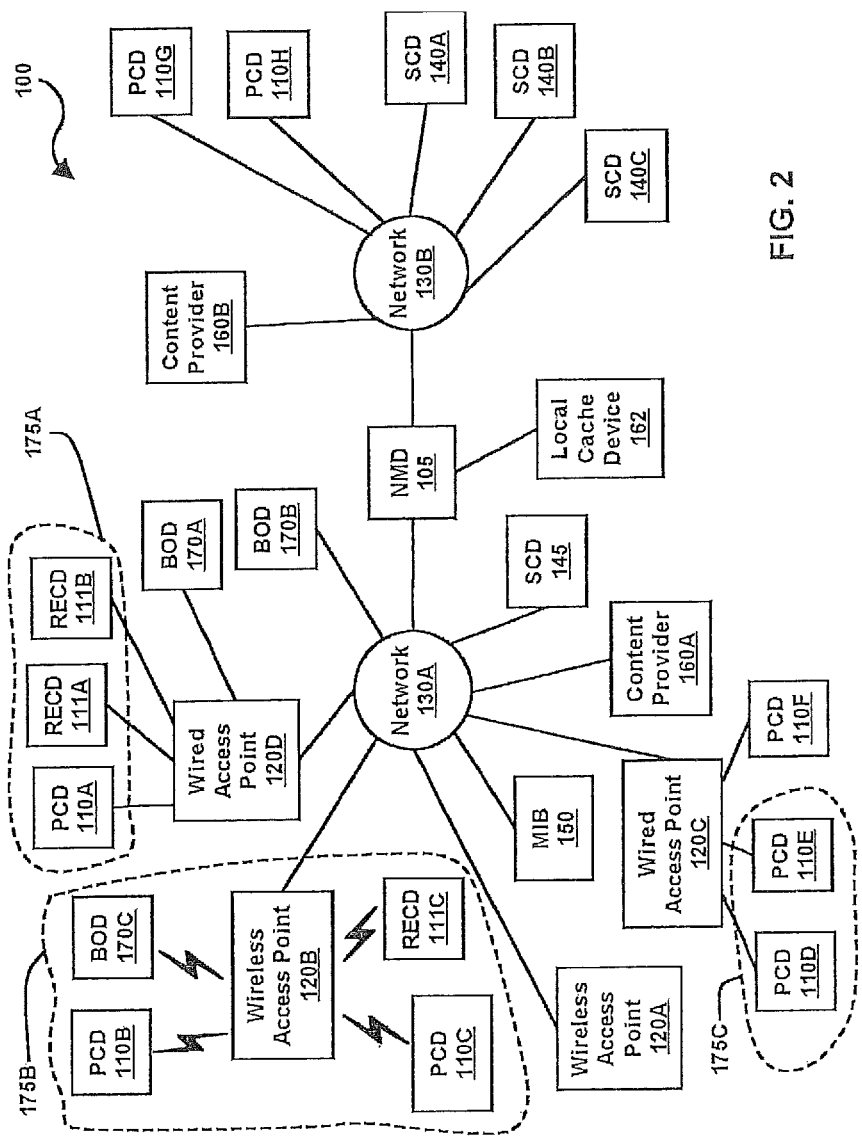
FIG. 2 is a block diagram of a network communication system, according to various embodiments.

In various embodiments, NMD 105 may service a single location. In some embodiments, NMD 105 may service two or more locations (e.g., locations 175A-175C), as shown in FIG. 2. For instance, each of various locations 175A-175C may include a portion of NCS 100. As described herein, a geographic location may include a geographic region. For instance, locations 175A-175C may be referred to as geographic locations and/or geographic regions, and they may include one or more areas of one or more sizes. In one example, location 175C may include a meeting room. In second example, location 175A may include a retail entity location, such as a coffee shop, a sandwich shop, a McDonalds location, etc. In another example, location 175B may include a city. More information regarding geographic location information may be found in U.S. Pat. No. 5,835,061, referenced above.

One or more of the systems described herein, such as PCDs 110A-110H, APs 120A-120D, BODs 170A-170C, MIB 150, content providers 160A-160B, server computing devices (SCDs) 140A-140C, and NMD 105 may include a memory medium on which computer programs and/or data according to the present invention may be stored. For example, each of the APs 120A-120D, and/or MIB 150 may store a data structure as described above including information regarding identification information, application identification information, protocol identification information, corresponding networks, and/or access information such as associated data routing and/or QoS methods. Each of the APs 120A-120D, and/or MIB 150 may further store a software program for accessing these data structures and using the information therein to properly provide and/or route data between computing devices and networks, and/or to selectively provide and/or route data depending on the access information and/or the QoS. In various embodiments, various of the systems and/or methods described herein may be used to provide network access from a first network to a second network. For example, the first network may include network 130A, and the second network may include network 130B.

In some embodiments, one or more computer systems may communicate with the one or more other computer systems using use one or more secure and/or encrypted methods and/or systems. For example, PCD 110A may communicate with the one or more computer systems (e.g., PCDs 110B-110H, NMD 105, SCDs 145, 140A-140C, and/or content providers 160A-160B) using TLS, HTTPS, and/or a SSL, among others.

The term "memory medium" and/or "computer readable medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium may include other types of memory as well, or combinations thereof. In some embodiments, the memory medium may be and/or include an article of manufacture and/or a software product. In addition, the memory medium may be located in a first computer in which the programs are executed, or may be located in a second different computer and/or hardware memory device that connects to the first computer over a network. In some embodiments, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may include one of the networks to which the current network is coupled, e.g., a SAN (Storage Area Network).

In various embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

The memory medium in one or more systems thus may store a software program and/or data for performing and/or enabling access and/or selective network access and/or network service. A CPU or processing unit in one or more systems executing code and data from a memory medium includes a means for executing one or more software program according to the methods and/or flowcharts described herein.

Referring now to FIGS. 3-6C, various flowchart diagrams are illustrated, according to various embodiments. FIGS. 3-6C include various methods that may be used in a client-server system.

Figure 3:
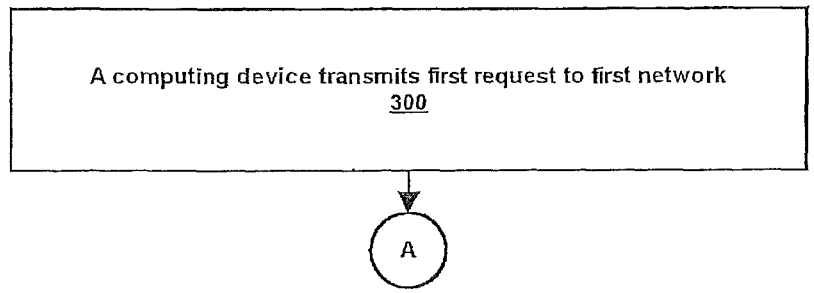
FIG. 3 is a flowchart diagram of a method, according to various embodiments.

Turning now to FIG. 3, a flowchart diagram of a method is illustrated, according to various embodiments. At 300, a computing device (e.g., one of PCDs 110A-110F, RECDs 111A-111C, BODs 170A-170C, and/or content provider 160A) may transmit a first request to a first network, such as network 130A. In various embodiments, the method illustrated in FIG. 3 may be used by a client in the client-server system.

Figure 4:
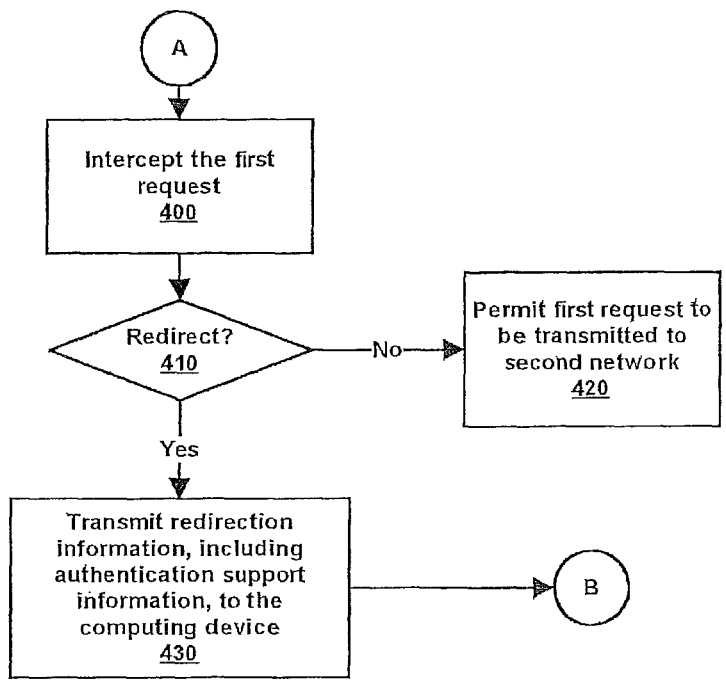
FIG. 4 is a flowchart diagram of a method, according to various embodiments.

Turning now to FIG. 4, where operation of the client server system may continue, a flowchart diagram of a method is illustrated, according to various embodiments. In various embodiments, the method illustrated in FIG. 4 may be used by a server in the client-server system. At 400, the first request from the computing device may be intercepted. For example, NMD 105 may intercept the request. In various embodiments, NMD 105 may include and/or implement an access controller that intercepts the request from the computing device. For instance, the request may include one or more data packets (e.g., Internet protocol packets, transmission control protocol packets, user datagram packets, etc.), and the access controller may examine information included in the one or more data packets. For example, the access controller may examine a destination address, a destination port, a source address, etc. In some embodiments, the access controller may include and/or implement a firewall and various services and/or attributes associated with firewalls.

Next at 410, it may be determined whether or not to redirect the request. For example, the access controller may determine to redirect the request based on information from the one or more data packets. For instance, the access controller may determine that the requests includes information such as a destination port (e.g., a known port of a web server, etc.), a destination address such as an Internet protocol (IP) address, and/or a source address of the computing device, among others. The source address of the computing device may include an IP address and/or a media access control (MAC) address, among others. In some embodiments, the destination address may not correspond to a computer system. For example, the destination address may be a mock address. For instance, the mock address may not be assigned to a computer system.

In various embodiments, an access control list may be used in determining whether or not to redirect the request. For example, the access control list may include a list of one or more addresses that may be accessed. For instance, an address of SCD 140A may be included in the list of addresses that may be accessed. Accordingly, if the destination address includes the address of SCD 140A, the request may be passed along to SCD 140A, at 420. In some embodiments, one or more access rules may be used in determining to redirect the request. For example, the one or more access rules may allow one or more requests from one or more source addresses to be passed along. For instance, the one or more rules may allow requests from source addresses of PCDs 110C-110E, BOD 170A, and/or RECD 111B to be passed along to network 130B, at 420.

If it is determined to redirect the request, the method may proceed to 430 where redirection information may be transmitted to the computing device. In some embodiments, a hypertext transfer protocol (HTTP) redirect may be transmitted to the computing device. For example, the redirect may include a location of a server. In one instance, the location may include an address of NMD 105. In another instance, the location may include an address of SCD 140A. In various embodiments, information associated with the redirection may be transmitted to the computing device. For example, the information associated with the redirection may include one or more of a service provider, an access procedure, an access location, an error code, a login uniform resource locator (URL), a message type, one or more wireless Internet service provider (WISP) access gateway parameters, a response code, and/or an authentication seed, among others. This information or one or more portions thereof may be considered authentication support information.

In various embodiments, the authentication seed may include a number (e.g., a string of numbers and/or digits) and/or an ASCII string of characters. In various embodiments, a first authentication seed may be combined with first data, a second, different, authentication seed may be combined with the first data, and a first result of a one-way hash function of the combination of the first authentication seed and the first data and a second result of the one-way hash function of the combination of the second authentication seed and the first data may be differing results from each other. In some embodiments, an authentication seed may be preselected, a result of a non-repetitive function, chosen at random, a result of a pseudo-random function generator, and/or a result of a random function generator.

As an example, possible redirection information is shown below in Table 1.

TABLE 1

HTTP/1.0 302 Redirect
Server: Apache 1.3.6
Location: http://SCD140A.wayport.net/login
<!--ServiceProvider=Wayport -->
<!--access procedure=WY.1 -->

TABLE 1-continued

```
<!--access location= wp_123.1234 -->
<!--error=0 -->
<!-- LoginURL= http://SCD140A.wayport.net/login -->
<!--
    <?xml version="1.0" encoding="UTF-8"?>
    <WISPAccessGatewayParam
        xmlns:xsi="http://www.w3.org/2001/XMLSchema-instance"
        xsi:noNamespaceSchemaLocation=
        "http://roamer.wayport.net/WayportGISParam.xsd">
      <Redirect>
        <AccessProcedure>1.0</AccessProcedure>
        <AccessLocation>wp_123.1234</AccessLocation>
        <LocationName>Wayport Cafe Property 123</LocationName>
        <AuthetcationSeed>1809212008</AuthenticationSeed>
        <LoginURL>http://SCD140A.wayport.net/login</LoginURL>
        <MessageType>100</MessageType>
        <ResponseCode>0</ResponseCode>
      </Redirect>
    </WISPAccessGatewayParam>
-->
```

As shown, one or more portions of authentication support information may be included in a data description language such as an extensible markup language (XML).

Figure 5:
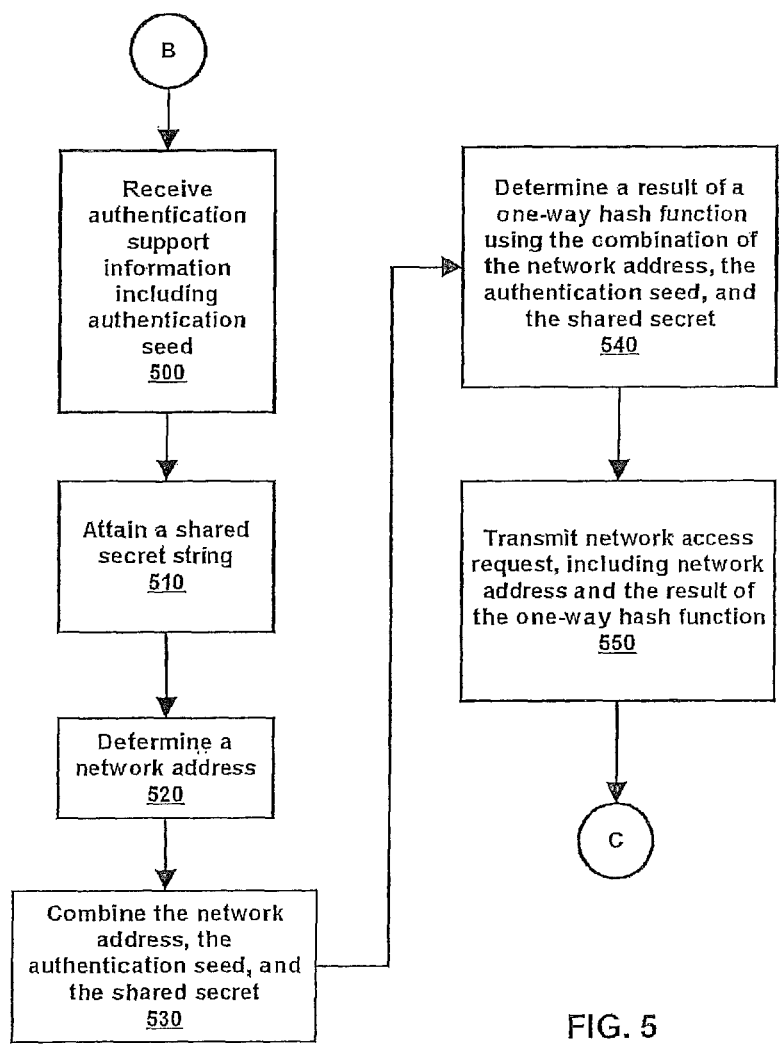
FIG. 5 is a flowchart diagram of a method, according to various embodiments.

Turning now to FIG. 5, where operation of the client server system may continue, a flowchart diagram of a method is illustrated, according to various embodiments. In various embodiments, the method illustrated in FIG. 5 may be used by a client in the client-server system. At 500, the computing device may receive the authentication support information. Next at 510, the computing device may attain a shared secret. In some embodiments, the computing device may attain the shared secret from a memory medium (e.g., a memory medium of the computing device). In various embodiments, the computing device may attain the shared secret from a server computing device (e.g., SCD 145). For example, the computing device may query and/or request the shared secret from the server computing device, and the server computing device may communicate the shared secret to the computing device.

In some embodiments, the shared secret may include characters and/or binary data. For example, the computing device may attain the shared secret by selecting from the one or more shared secrets in Table 2. In various embodiments, the shared secrets shown in Table 2 may be stored in a memory medium of a client and/or a server in the client-server system. In some embodiments, the computing device may communicate with a server computing device (e.g., SCD 145) to attain a shared secret, and the server computing device may provide the shared secret to the computing device. The server computing device may select the shared secret from the one or more shared secrets in Table 2. The server computing device and the computing device may communicate in a secure fashion (e.g., using TLS, HTTPS, SSL, etc.).

TABLE 2

"Mary had @ !ittle l&mb"
"76a7c626a4f0d976725bda3afbe9f373"
"Everybody is somebody else's weirdo"
"Fourscore and seven years ago our fathers brought forth on this continent a new nation, conceived in liberty and dedicated to the proposition that all men are created equal"
"a5d7f9d6a5aa1d %$@!~"
"What a piece of work is man"
"What merchant's ships have my sighs drown'd?"
"Never test a river depth with both feet"
"Patience will come to those who wait for it"
"A learned blockhead is a greater blockhead than an ignorant one"

Next at 520, the computing device may determine a network address. In some embodiments, the computing device may determine its MAC address as the network address. Next at 530, the network address, the authentication seed, and the shared secret string may be combined. In one example, the network address may include "00:0d:a3:88:be:fe", the authentication seed may include "1809212008", and the selected or attained shared secret may include "Mary had a little lamb", and the combination may include "00:0d:a3:88:be:fe1809212008Mary had a little lamb".

Next at 540, a result of a one-way hash function of the combination of the network address, the authentication seed, and the shared secret may be determined. In some embodiments, the result of the one-way hash function may be considered a message authentication code that may be used to authenticate data.

In various embodiments, a one-way hash function may be relatively easy to compute (e.g., calculate by a processor executing instructions from a computer-readable medium) and significantly difficult to reverse. For example, for a value x (e.g., a number, a string, binary data, etc.) and a one-way hash function $f$, $f(x)$ is relatively easy to compute, and for a value $f(z)$, z is significantly difficult to compute. In various embodiments, significantly difficult to compute may mean that it could take years to compute z from $f(z)$, even if multiple computers were applied to the task. In some embodiments, a one-way hash function may be considered collision free. For example, the one-way hash function may be one-to-one or injective and, thus, may be considered collision free. In various instances, one-way hash functions may be considered a cryptographic checksum, a message digest, a digital fingerprint, a message integrity check, a contraction function, a compression function, and/or a manipulation detection code. Various examples of one-way hash functions may include one or more of message digest (MD) 2, MD 4, MD 5, RIPE-MD, Abreast Davies-Meyer, Davies-Meyer, HAVAL, GOST Hash, N-HASH, SHA (secure hash algorithm), and/or SNEFRU, among others. In some embodiments, a one-way hash function may be a composite function of two or more one-way hash functions. For example, a function g may include a MD 5 one-way hash function, a function h may include a SHA one-way hash function, and a function j may include a MD 5 one-way hash function, and a function $f$ may include a composite function such that $f(x)=g(h(j(x)))$. A one-way hash function that is a composite function of two or more one-way hash functions may be considered to be and/or said to be strengthened.

In one example, the one-way hash function applied at 540 may include a MD 5 one-way hash function, and a result of the MD 5 one-way hash function of the combination from 530 may include "98ae32fb785a882bf607be669e9790c2" which is a hexadecimal representation of a 128-bit number.

Next at 550, the computing device may transmit a network access request to a server. The network access request may include the address determined at 520 and the result of the one-way hash function determined at 540. In one example, the network access request may be transmitted to SCD 140A. In a second example, the access request may be transmitted to NMD 105.

In various embodiments, SCD 140A and/or NMD 105 may include a web server that may receive the network access request. For example, the web server may receive information included in Table 3, below.

TABLE 3

```
POST /login HTTP/1.0
Content-Length: 147
MacAddr=00:0d:a3:88:be:fe&IpAddr=192.168.1.1&PortType=Guest&
NmdId=351&username=Wellcent/00:0d:a3:88:be:fe&
password=98ae32fb785a882bf607be669e9790c2
```

As shown in Table 3, the username may include a realm. For example, the realm may include "Wellcent" that may indicate a roaming partner and/or a network provider associated with an operator of NCS 100. As also shown in Table 3, the username may include the address determined at 520, and the password may include the result of the one-way hash function, determined at 540.

In some embodiments, one or more of SCDs 140A-140C and/or NMD 105 may include authentication, authorization, and accounting (or "AAA") processes and/or services. RADIUS (Remote Authentication Dial-In User Service) is an example of an AAA service used by various Internet Service Providers (ISPs). (The RADIUS specification is maintained by a working group of the Internet Engineering Task Force, the main standards organization for the Internet, e.g., see RFC 2865 and RFC 2866.) In one example, a user may connect a computing device to an Internet service provider (ISP), the user's username and password may be transmitted to an AAA server (e.g., a RADIUS server) and/or to an AAA interface server (e.g., a web server). The AAA server may then check that the information is correct and authorize access to the ISP's system and/or services. Other protocols for providing an AAA framework may include DIAMETER (an extension of RADIUS), EAP (Extensible Authentication Protocol), TACACS (Terminal Access Controller Access Control System), TACACS+, and/or XTACAS, 802.1x, WPA, 802.11i, among others. In various embodiments, these may also be used for applications, such as access to network service and/or IP mobility, and are intended to work in both local AAA and roaming situations.

In one example, AAA processes and/or services of SCD 140A and/or NMD 105 may receive a username of "Wellcent/00:0d:a3:88:be:fe" and a password of "98ae32fb785a882bf607be669e9790c2". As described above, the username may include a realm (e.g., "Wellcent") that may indicate a roaming partner and/or network provider associated with an operator of NCS 100 and may include the address determined at 520, and the password may include the result of the one-way hash function, determined at 540. In some embodiments, the username and password may be RADIUS-qualified. In various embodiments, the result of the one-way hash function, determined at 540, may be included in a vendor specific attribute (VSA).

In some embodiments, SCD 140A and/or NMD 105 may proxy one or more AAA requests to another computer system. In one example, NMD 105 may proxy one or more AAA requests to SCD 140A. In another example, SCD 140A may proxy one or more AAA requests to SCD 140B.

Figure 6A:
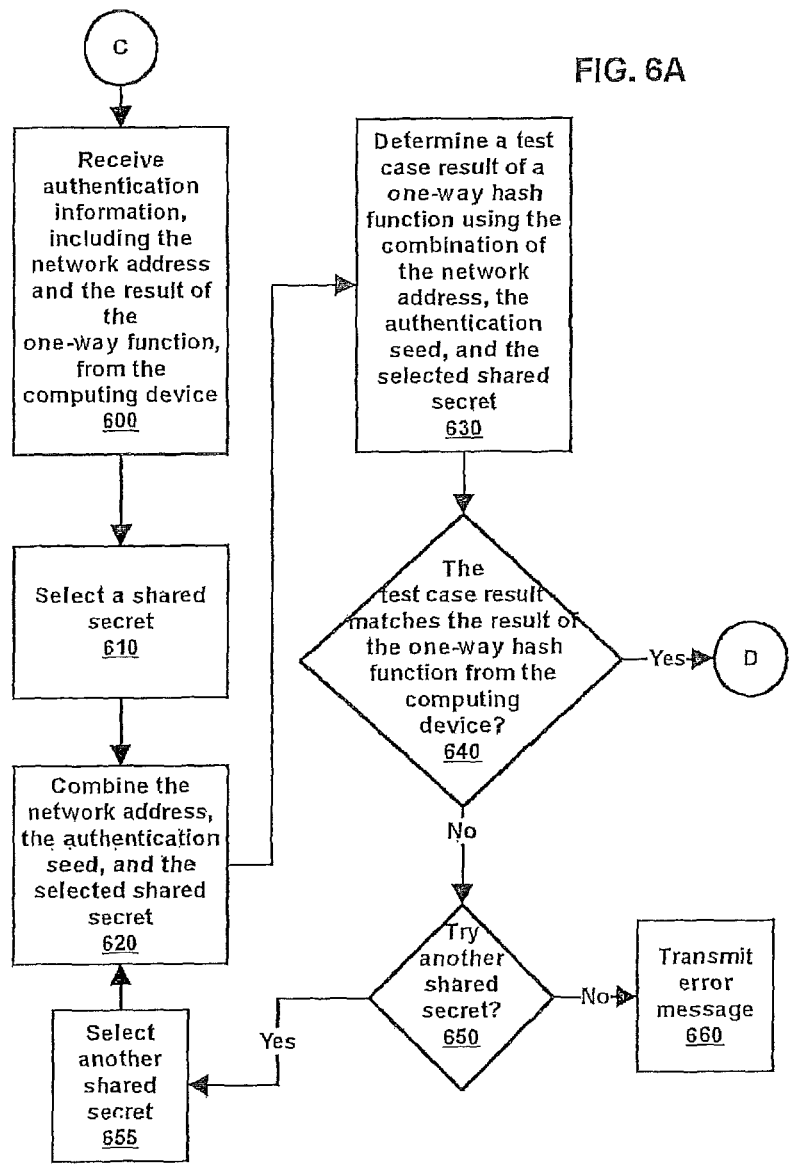
FIG. 6A is a flowchart diagram of a method, according to various embodiments.

Turning now to FIG. 6A, where operation of the client server system may continue, a flowchart diagram of a method is illustrated, according to various embodiments. In various embodiments, the method illustrated in FIG. 6A may be used by a server in the client-server system. At 600, the network address of the computing device and the result of the one-way hash function may be received from the computing device. Next at 610, a shared secret may be selected. For example, a shared secret may be selected from a memory medium that may store one or more shared secrets, such as those shown in Table 2. Next at 620, the network address, the authentication seed, and the shared secret may be combined, and a test case result of a one-way hash function using the combination of the network address, the authentication seed, and the shared secret may be determined at 630. At 640, it may be determine whether or not the test case result matches the result of the one-way hash function received from the computing device. If not, the method may proceed to 650, where it may be determined whether or not to try another shared secret. If so, the method may proceed to 655, where another shared secret may be selected. For example, another shared secret may be selected from those of Table 2. If not, the method may proceed to 660, where an error message may be transmitted to the computing device and/or an access controller, such as NMD 105.

If the test case result matches the result of the one-way hash function received from the computing device, the method may proceed from 640 to either 665 of FIG. 6B or 665 of FIG. 6C.

Turning now to FIG. 6B, where operation of the client server system may continue, a flowchart diagram of a method is illustrated, according to various embodiments. In various embodiments, the method illustrated in FIG. 6B may be used by a server in the client-server system. At 665, it may be determined whether or not the computing device is authorized access to a second network, such as network 130B. If not, the method may proceed to 670, where an error message may be transmitted to the computing device and/or an access controller, such as NMD 105. If so, the method may proceed to 675, where the computing device may be permitted to access the second network (e.g., network 130B). In some embodiments, an authorization message may be transmitted from a server (e.g., one of SCD 140A-140C) to NMD 105 which may permit the computing device access of network 130B.

In some embodiments, access to a second network such as network 130B may be based on a geographic location of the computing device. For example, the computing device may be authorized to access network 130B; however, the computing device may be permitted to access network 130B from a first location (e.g., location 175A) and not permitted to access network 130B from a second location (e.g., location 175C). A flowchart diagram of a method is illustrated in FIG. 6C, according to these embodiments, and the method illustrated in FIG. 6C may be used by a server in the client-server system. Elements 665, 670, and 675 of FIG. 6C may be described according to elements 665, 670, and 675 of FIG. 6B, described above.

Turning now to element 667 of FIG. 6C, a geographic location of the computing device may be determined. For example, the geographic location may include one of locations 175A-175C. Next at 668, it may be determined whether or not the computing device is permitted access to a second network (e.g., network 130B) from the geographic location. If not, the method may proceed to 670. If so, the method may proceed to 675.

Figure 7:
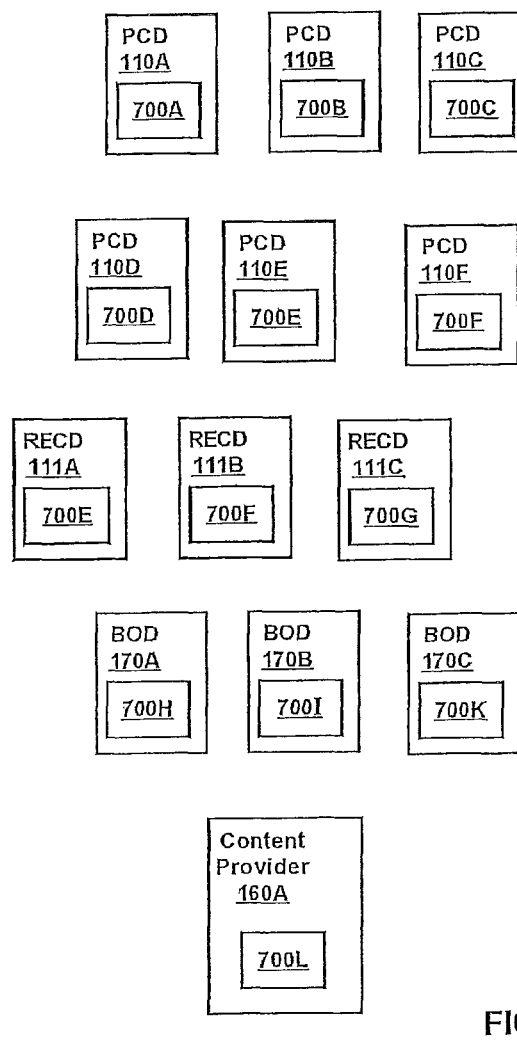
FIG. 7 is a block diagram of various computer systems and various computer readable mediums, according to various embodiments.

Turning now to FIG. 7, a block diagram of various computer systems and computer readable mediums is illustrated, according to various embodiments. In various embodiments, one or more computer readable mediums 700A-700L may include instructions, which when executed on a respective processing system or computer system PCDs 110A-110F, RECDs 111A-111C, BODs 170A-170C, and content provider 160A, may cause the respective processing system or computer system to perform the methods, or one or more portions of the methods thereof, described with reference to FIG. 3 and FIG. 5. In various embodiments, PCDs 110A-110F, RECDs 111A-111C, BODs 170A-170C, and content provider 160A may include respective computer readable mediums 700A-700L, as shown in FIG. 7.

Figure 8A:
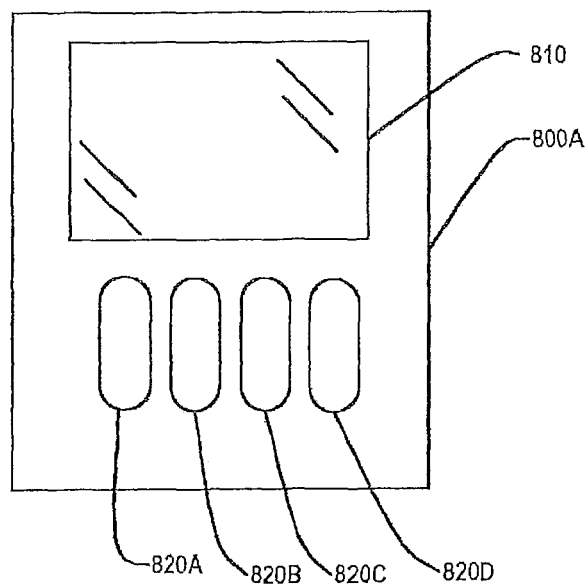
FIG. 8A is a block diagram of a limited user input computing device, according to various embodiments.
Figure 8B:
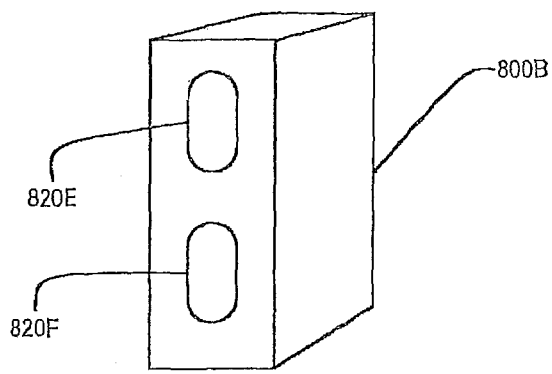
FIG. 8B is a block diagram of a limited user input computing device, according to various embodiments.

Turning now to FIGS. 8A and 8B, block diagrams of limited user input computing devices are illustrated, according to various embodiments. As shown in FIG. 8A, a computing device 800A may include a display 810 and/or one or more buttons and/or switches 820A-820D. In some embodiments, display 810 may accept pressure input from a user. As shown in FIG. 8B, a computing device 800B may include one or more buttons and/or switches 820E-820F. In various embodiments, computing device 800A and/or computing device 800B may be considered to be a limited user input computing device. In some embodiments, computing device 800A and/or computing device 800B may include one of PCDs 110A-110F, RECDs 111A-111C, BODs 170A-170C, and content provider 160A.

Figure 9:
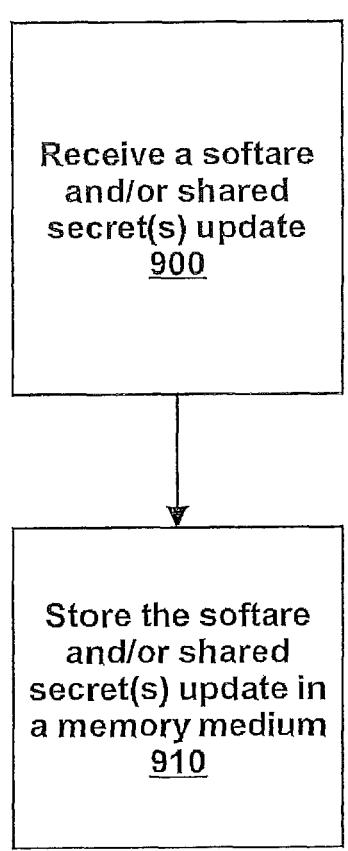
FIG. 9 is a flowchart diagram of a method, according to various embodiments.

Turning now to FIG. 9, a flowchart diagram of a method is illustrated, according to various embodiments. At 900, a computing device (e.g., one of PCDs 110A-110F, RECDs 111A-111C, BODs 170A-170C, and content provider 160A) may receive a software and/or shared secret(s) update. In some embodiments, software and/or shared secret(s) may be updated from time-to-time. For example, updating software and/or shared secret(s) may be used in various efforts to prevent one or more compromises of one or more methods and/or systems described herein. The software and/or shared secret(s) update may be referred to as a firmware update. In various embodiments, the shared secret(s) may be interleaved in the software. In some embodiments, the shared secret(s) may be encrypted.

In various embodiments, the software and/or shared secret(s) update may be received from a network. In some embodiments, the computer system may communicate with the one or more other computer systems using use one or more secure and/or encrypted methods and/or systems. For example, PCD 110A may communicate with the one or more computer systems (e.g., PCDs 110B-110H, NMD 105, SCDs 140A-140C, and/or content providers 160A-160B) using TLS, HTTPS, and/or a SSL, among others. In various embodiments, the software and/or shared secret(s) update may be received from another computer system and/or a memory medium. For example, the software and/or shared secret(s) update may be received from a thumb drive, a removable hard drive, a floppy disk, a solid state drive (SSD), CD-ROM, DVD-ROM, a flash card, and/or a TEAclipper device, among others. In some embodiments, the software and/or shared secret(s) update may only be used one or more time finite times.

Next at 910, the software and/or shared secret(s) update may be stored in a memory medium of the computing device.

Figure 10:
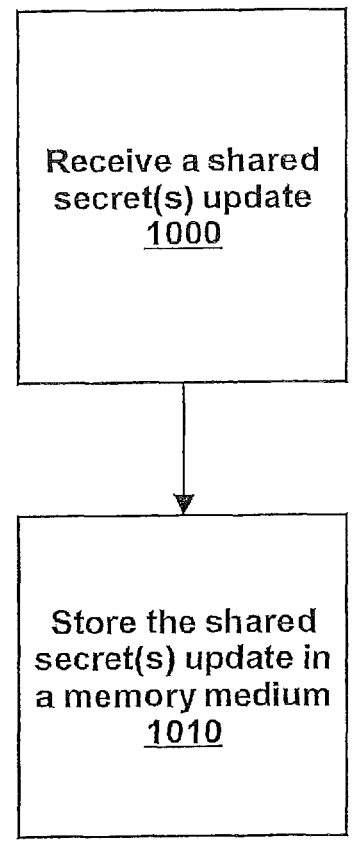
FIG. 10 is a flowchart diagram of a method, according to various embodiments.

Turning now to FIG. 10, a flowchart diagram of a method is illustrated, according to various embodiments. At 1000, a server computing device (e.g., SCD 145) that may provide one or more shared secrets to one or more computing devices (e.g., one or more of PCDs 110A-110F, RECDs 111A-111C, BODs 170A-170C, and content provider 160A) may receive a shared secret(s) update from another server computing device (e.g., SCD 140B). For example, SCD 145 and SCD 140B may communicate in a secure fashion (e.g., using TLS, HTTPS, SSL, etc.) when SCD 145 is attaining the shared secret(s) update.

Next at 1010, the server computing device (e.g., SCD 145) may store the shared secret(s) update in a memory medium.

It is noted that, in various embodiment, one or more of the method elements described herein and/or one or more portions of an implementation of a method element may be performed in varying orders, may be performed concurrently with one or more of the other method elements, or may be omitted. Additional method elements may be performed as desired. In various embodiments, concurrently may mean simultaneously. In some embodiments, concurrently may mean apparently simultaneously according to some metric. For example, two or more method elements and/or two or more portions of an implementation of a method element may be performed such that they appear to be simultaneous to a human. It is also noted that, in various embodiments, one or more of the system elements described herein may be omitted and additional system elements may be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
sending a request from a client device via a first network to a second network, wherein the first network is different from the second network;
receiving, at the client device, redirection information in response to the request, wherein the redirection information includes an authentication seed and an address of a server that provides access control of the second network;
in response to receiving the authentication seed:
obtaining a shared secret at the client device;
computing, with the client device, a result of a one-way hash function for a combination of a network address of the client device, the authentication seed, and the shared secret; and
transmitting the network address and the result to the server, wherein the server makes a determination whether the client device is authorized to access the second network based on a comparison of the result to a test case computed by the server using the one-way hash function for a combination of the network address received by the server from the computing device, the authentication seed, and a secret selected by the server; and
receiving a response to the request via the second network, the response indicating a determination by the server that the client device is authorized to access the second network.

2. The method of claim 1, wherein transmitting the network address and the result of the one-way hash function to the server includes transmitting a remote authentication dial-in user service username that includes the network address and a remote authentication dial-in user service password that includes the result of the one-way hash function to the server.

3. The method of claim 2, further comprising automatically attaching a realm to the remote authentication dial-in user service username, wherein the realm indicates a network provider associated with the client device.

4. The method of claim 1, wherein the network address includes a media access control address.

5. The method of claim 1, wherein obtaining the shared secret comprises retrieving the shared secret from a memory of the client device.

6. The method of claim 1, wherein the first network is a local area network and wherein the second network includes an internet.

7. The method of claim 1, wherein obtaining the shared secret comprises receiving the shared secret from a computing device coupled to the first network, the second network, or a combination thereof.

8. A device comprising:
a processor; and
a memory coupled to the processor, wherein the memory includes processor-executable instructions that, when executed by the processor, cause the processor to perform operations including:
receiving redirection information via a first network in response to a request sent by the processor via the first network to a second network, wherein the redirection information includes an authentication seed, an address of a first server that provides a secret, and an address of a second server that provides access to the second network, wherein the first network is different from the second network;
receiving the secret from the first server in response to a query sent from the processor to the first server;
determining a network address of a client device;
computing a result of a one-way hash function of a combination of the network address, the authentication seed, and the secret received from the first server;
transmitting to the second server, wherein the data includes the network address and the result, wherein the second server makes a determination whether the client device is authorized to access the second network based on a comparison of the result to a test case computed by the second server using the one-way hash function for a combination of the network address, the authentication seed, and a secret selected by the second server; and
accessing the second network in response to the determination that the client device is authorized to access the second network.

9. The device of claim 8, wherein the data comprises a remote authentication dial-in user service username that includes the network address and a remote authentication dial-in user service password that includes the result of the one-way hash function.

10. The device of claim 9, wherein the operations further include automatically attaching a realm to the remote authentication dial-in user service username, wherein the realm indicates a network provider associated with the client device.

11. The device of claim 8, wherein the network address includes a media access control address.

12. The device of claim 8, wherein the operations further include transmitting a request to the second network.

13. The device of claim 8, wherein the secret selected by the second server is selected from a list of secrets.

14. The device of claim 8, wherein the first server is coupled to the second network.

* * * * *